(12) United States Patent
Hilgendorff et al.

(10) Patent No.: US 10,449,522 B2
(45) Date of Patent: Oct. 22, 2019

(54) PROCESS FOR MANUFACTURE OF $NO_x$ STORAGE MATERIALS

(71) Applicant: BASF Corporation, Florham Park, NJ (US)

(72) Inventors: Marcus Hilgendorff, Hannover (DE); Andreas Stohr, Besigheim (DE); Hermann Bidlingmaier, Bietigheim-Bissingen (DE); Joachim Fellger, Besigheim (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/747,240

(22) PCT Filed: Jul. 29, 2016

(86) PCT No.: PCT/EP2016/068180
§ 371 (c)(1),
(2) Date: Jan. 24, 2018

(87) PCT Pub. No.: WO2017/017258
PCT Pub. Date: Feb. 2, 2017

(65) Prior Publication Data
US 2018/0214856 A1 Aug. 2, 2018

(30) Foreign Application Priority Data

Jul. 30, 2015 (EP) .................................... 15179006

(51) Int. Cl.
*B01J 27/232* (2006.01)
*B01J 23/63* (2006.01)
(Continued)

(52) U.S. Cl.
CPC ........ *B01J 27/232* (2013.01); *B01D 53/9422* (2013.01); *B01J 23/10* (2013.01);
(Continued)

(58) Field of Classification Search
CPC . B01J 23/10; B01J 23/63; B01J 35/002; B01J 35/023; B01J 35/026; B01J 35/04;
(Continued)

(56) References Cited

U.S. PATENT DOCUMENTS 3,974,098 A * 8/1976 Gavin ...................... B01J 23/83
502/174
4,965,243 A * 10/1990 Yamada ................... B01J 23/58
423/213.5
(Continued)

FOREIGN PATENT DOCUMENTS

CN 10 2260902 * 11/2011 ............... C09D 1/00
CN 10 2649578 * 8/2012 ............. B82Y 40/00
(Continued)

OTHER PUBLICATIONS

Liangfang Lv et al., "The lean NOx traps behavior of (1-5%) BaO/CeO2 mixed with Pt/Al2O3 at low temperature (100-300° C.): The effect of barium dispersion." Chemical Engineering Journal 222, pp. 401-410. (Year: 2013).*
(Continued)

*Primary Examiner* — Patricia L. Hailey
(74) *Attorney, Agent, or Firm* — Oblon, McClelland, Maier & Neustadt, L.L.P.

(57) ABSTRACT

Processes for manufacturing nitrogen oxide storage materials and lean NOx trap catalysts are disclosed. Also disclosed are nitrogen oxide storage material made by processes comprising barium carbonate ($BaCO_3$) and ceria ($CeO_2$) by using $Ba(OH)_2$ instead of most or all $Ba(OOCH_3)_2$ to reduce cost and reduce harmful byproducts. Aspects of the present invention also relate generally to lean $NO_x$ trap (LNT) comprising nitrogen oxide storage materials.

23 Claims, 7 Drawing Sheets (51) Int. Cl.
*B01D 53/94* (2006.01)
*B01J 37/02* (2006.01)
*B01J 37/04* (2006.01)
*B01J 37/08* (2006.01)
*B01J 35/00* (2006.01)
*B01J 35/02* (2006.01)
*B01J 35/04* (2006.01)
*B01J 35/10* (2006.01)
*B01J 37/00* (2006.01)
*B01J 23/10* (2006.01)

(52) U.S. Cl.
CPC .............. *B01J 23/63* (2013.01); *B01J 35/002* (2013.01); *B01J 35/023* (2013.01); *B01J 35/026* (2013.01); *B01J 35/04* (2013.01); *B01J 35/1014* (2013.01); *B01J 37/0036* (2013.01); *B01J 37/0201* (2013.01); *B01J 37/0234* (2013.01); *B01J 37/04* (2013.01); *B01J 37/08* (2013.01); *B01D 2255/102* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/2092* (2013.01); *B01D 2255/91* (2013.01); *B01D 2255/9155* (2013.01)

(58) Field of Classification Search
CPC ............... B01J 35/1014; B01J 37/0036; B01J 37/0201; B01J 37/0234; B01J 37/04; B01J 37/08; B01D 53/9422; B01D 2255/102; B01D 2255/021; B01D 2255/1023; B01D 2255/1025; B01D 2255/2042; B01D 2255/2065; B01D 2255/2092; B01D 2255/91; B01D 2255/9155
USPC .................................. 502/174, 304; 423/432
See application file for complete search history.

(56) References Cited

U.S. PATENT DOCUMENTS

| | | | |
|---|---|---|---|
| 6,350,421 B1 | 2/2002 | Strehlau et al. | |
| 6,602,820 B1 | 8/2003 | Göbel et al. | |
| 8,304,074 B2* | 11/2012 | Ichimura | B82Y 30/00 423/430 |
| 2003/0125202 A1 | 7/2003 | Ruwisch et al. | |
| 2008/0120970 A1* | 5/2008 | Hilgendorff | B01D 53/9422 60/299 |
| 2009/0131243 A1* | 5/2009 | Wittrock | B01D 53/9409 502/55 |
| 2009/0304564 A1 | 12/2009 | Hilgendorff et al. | |
| 2012/0023915 A1 | 2/2012 | Hilgendorff et al. | |
| 2012/0045381 A1* | 2/2012 | Shimizu | C01F 11/188 423/265 |
| 2013/0023915 A1 | 1/2013 | Mueller | |
| 2013/0260987 A1* | 10/2013 | Nakanishi | B01J 23/63 502/304 |
| 2013/0316175 A1* | 11/2013 | Jiang | C01F 11/188 428/402 |

FOREIGN PATENT DOCUMENTS

| | | | | |
|---|---|---|---|---|
| JP | 01-167216 | * | 6/1989 | ............. C01F 11/18 |
| WO | WO 2008/067375 A1 | | 6/2008 | |

OTHER PUBLICATIONS

Lei Wang et al., "In situ DRIFTS study of NOx adsorption behavior on Ba/CeO2 catalysts." Journal of Rare Earths, vol. 31, No. 11, pp. 1074-1080 (Year: 2013).*
U.S. Appl. No. 15/124,146, filed Jan. 26, 2017, US2017/0021338, Grubert et al.
U.S. Appl. No. 15/574,910, filed Nov. 17, 2017, Punke et al.
U.S. Appl. No. 15/555,131, filed Feb. 15, 2018, US2018/0043335, Grubert et al.
U.S. Appl. No. 15/555,142, filed Feb. 15, 2018, US2018/0043336, Grubert et al.
International Search Report dated Nov. 24, 2016 in PCT/EP2016/068180.
Maria Casapu, et al., "Formation and Stability of Barium Aluminate and Cerate in NO$_x$ Storage-Reduction Catalysts", Applied Catalysis B: Environmental, vol. 63, No. 3-4, XP028000953A, Mar. 31. 2006, pp. 232-242.

* cited by examiner

PROCESS FOR MANUFACTURE OF $NO_x$ STORAGE MATERIALS

Principles and embodiments of the present invention relate generally to a process for manufacturing nitrogen oxide storage materials, in particular barium carbonate ($BaCO_3$) supported on ceria ($CeO_2$).

Emission of nitrogen oxides ("$NO_x$") from lean burn engines must be reduced in order to meet emission regulation standards. Conventional three-way conversion ("TWC") automotive catalysts are suitable for abating $NO_x$, carbon monoxide a ("CO") and hydrocarbon ("HC") pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel ("A/F") ratio of 14.65:1 (weight of air to weight of fuel) is the stoichiometric ratio corresponding to the combustion of a hydrocarbon fuel, such as gasoline. The symbol $\lambda$ is thus used to represent the result of dividing a particular A/F ratio by the stoichio-metric A/F ratio for a given fuel, so that; $\lambda=1$ is a stoichiometric mixture, $\lambda>1$ is a fuel-lean mixture and $\lambda<1$ is a fuel-rich mixture.

Engines, especially gasoline-fueled engines to be used for passenger automobiles and the like, are being designed to operate under lean conditions as a fuel economy measure. Such engines are referred to as "lean-burn engines." That is, the ratio of air to fuel in the combustion mixtures supplied to such engines is maintained considerably above the stoichiometric ratio (e.g., at an air-to-fuel weight ratio of 18:1) so that the resulting exhaust gases are "lean", i.e., the exhaust gases are relatively high in oxygen content. Although lean-burn engines provide enhanced fuel economy, they have the disadvantage that conventional TWC catalysts are not effective for reducing $NO_x$ emissions from such engines because of excessive oxygen in the exhaust.

Attempts to overcome this problem have included selective catalytic reduction (SCR) catalyst for $NO_x$ that operates in the presence of excess of oxygen. In that case the reductant must be present in the exhaust gas or must be added from outside by a special injection system. Another possibility is the use of $NO_x$ storage reduction (NSR) catalysts, which are also known as "lean $NO_x$ traps (LNT)." Use of LNTs involves operating lean-burn engines with brief periods of fuel-rich operation (engines which operate in this fashion are sometimes referred to as "partial lean-burn engines"). The exhaust of such engines is treated with a catalyst/$NO_x$ sorbent which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO and/or hydrogen present in the exhaust.

Diesel engines provide better fuel economy than gasoline engines and normally operate 100% of the time under lean conditions, where the reduction of $NO_x$ is difficult due to the presence of excess oxygen. In this case, the catalyst/$NO_x$ sorbent is effective for storing $NO_x$. As in the case of the gasoline partial lean burn application, after the $NO_x$ storage mode, a transient rich condition can be utilized to release/reduce the stored $NO_x$ to nitrogen. In the case of the diesel engine, this transient reducing condition may require unique engine calibration or injection of a diesel fuel into the exhaust to create the reducing environment.

$NO_x$ storage (sorbent) components including alkaline earth metal oxides, such as oxides of Mg, Ca, Sr, and Ba, alkali metal oxides such as oxides of Li, Na, K, Rb and Cs, and rare earth metal oxides such as oxides of Ce, La, Pr and Nd in combination with precious metal catalysts such as platinum dispersed on an alumina support have been used in the purification of exhaust gas from an internal combustion engine.

For $NO_x$ storage, baria (BaO) is usually preferred because it forms nitrates at lean engine operation and releases the nitrates relatively easily under rich conditions. However, catalysts that use baria for $NO_x$ storage exhibit a problem in practical application, particularly when the catalysts are aged by exposure to high temperatures and lean operating conditions. After such exposure, such catalysts show a marked decrease in catalytic activity for $NO_x$ reduction, particularly at low temperature (200° C. to 350° C.) and high temperature (450° C. to 600° C.) operating conditions. In addition, $NO_x$ absorbents that include baria suffer from the disadvantage that when exposed to temperatures above 450° C. in the presence of $CO_2$, barium carbonate ($BaCO_3$) forms, which becomes more stable than barium nitrate. Furthermore, barium tends to sinter and to form composite compounds with support materials, which leads to the loss of $NO_x$ storage capacity.

$NO_x$ storage materials comprising barium fixed to ceria ($CeO_2$) particles have been reported, and these $NO_x$ materials have exhibited improved thermal aging properties compared to the catalyst materials described above. As described in US20013/0023915A1 and $BaCO_3$/Ceria mixtures have been prepared with barium acetate (BaOAc) as starting compound. It would be desirable to improve existing processes for manufacturing $NO_x$ storage materials.

Principles and embodiments of the present invention relate to a process of producing $NO_x$ storage materials. Specific embodiments are directed to processes of preparing $BaCO_3$/ceria mixtures from barium hydroxide. The $BaCO_3$/ceria mixtures may be deposited on a substrate as a nitrogen oxide storage material to form a lean $NO_x$ trap catalyst for abatement of $NO_x$ in an exhaust gas stream.

One aspect of the present invention is related to a process for manufacturing barium carbonate ($BaCO_3$) supported on ceria ($CeO_2$) from a mixture of $Ba(OH)_2$, $CeO_2$, and $H_2O$. The mixture can be milled in a suitable mill such as a ball mill. The mixture is dried and calcined to provide barium carbonate supported on ceria.

Other aspects pertain to nitrogen oxide storage materials and lean $NO_x$ trap catalysts, which can be made by the methods described herein.

Various embodiments are listed below. It will be understood that the embodiments listed below may be combined not only as listed below, but in other suitable combinations in accordance with the scope of the invention.

The features and advantages of the present invention will be more fully understood with reference to the following, detailed description when taken in conjunction with the accompanying figures, wherein.

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in various embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Principles and embodiments of the present invention relate to lean NO$_x$ traps (LNTs), where NO$_x$ may be stored by a basic compound during lean engine operation and released and reduced during a short rich operation period. In various embodiments, a mixture of BaCO$_3$ with ceria may be utilized for NO$_x$ storage because it forms nitrates under lean engine operation and releases the nitrate relatively easy under rich conditions.

Principles and embodiments of the present invention also relate to efficient NO$_x$ adsorbers, also referred to as nitrogen oxide storage material(s), produced with a mixture of BaCO$_3$ and CeO$_2$, where the BaCO$_3$ is produced from a reaction of barium hydroxide. The NO$_x$ adsorber(s) may be applied to NO$_x$ adsorber catalysts technologies for gasoline and diesel applications.

Principles and embodiments of the present invention also relate to the synthesis of NO$_x$ adsorber(s) or nitrogen oxide storage materials. Such materials can include BaCO$_3$/CeO$_2$ obtained from mixtures from Ba(OH)$_2$, H$_2$O, and CeO$_2$.

Embodiment one pertains to a process for manufacturing barium carbonate (BaCO$_3$) supported on ceria (CeO$_2$), comprising mixing Ba(OH)$_2$ with CeO$_2$ and H$_2$O to provide a mixture; drying the mixture at a temperature in the range of about 100° C. to about 150° C. to provide a dried mixture; and calcining the dried mixture at a temperature in the range of about 40° C. to about 700° C. In embodiment 2, embodiment 1 is modified, wherein the dried mixture is calcined in an air atmosphere at a temperature in the range of about 40° C. to about 450° C.

In embodiment 3, embodiment 1 is modified, wherein the dried mixture is calcined in a CO$_2$ gas atmosphere. In embodiment 4, embodiment 3 is modified, wherein the dried mixture is calcined at a calcining temperature in the range of about 400° C. to about 700° C. In embodiment 5, embodiment 4 is modified, wherein the dried mixture is calcined for a period of time in the range of about 30 minutes to about 120 minutes. In embodiment 6, embodiment 5 is modified, wherein the dried mixture is calcined for a period of time in the range of about 45 minutes to about 75 minutes. In embodiment 7, embodiment 5 is modified, wherein the dried mixture is heated from room temperature to the calcining temperature over a period of about 150 minutes to about 210 minutes. In embodiment 8, any of embodiments 1-7 are modified, wherein the amount of Ba(OH)$_2$ in the mixture of Ba(OH)$_2$, CeO$_2$, and H$_2$O is in the range of 2% to about 15% by weight, and the amount of H$_2$O in the mixture of Ba(OH)$_2$, CeO$_2$, and H$_2$O is in the range of 30% to about 50% by weight, and the mixture of Ba(OH)$_2$, CeO$_2$, and H$_2$O total 100%.

In embodiment 9, any of embodiments 1-8 are modified, wherein the amount of Ba(OH)$_2$ in the mixture of Ba(OH)$_2$, CeO$_2$, and H$_2$O is in the range of 10% to about 15% by weight, and the amount of H$_2$O in the mixture of Ba(OH)$_2$, CeO$_2$, and H$_2$O is in the range of 35% to about 45% by weight, and the mixture of Ba(OH)$_2$, CeO$_2$, and H$_2$O total 100%. In embodiment 10, any of embodiments 1-9 are modified, wherein the mixture is dried at a temperature in the range of about 125° C. to about 135° C. for a period of time in the range of about 8 hours to about 18 hours. In embodiment 11, any of embodiments 1-10 are modified, wherein the mixture is dried for a period of time in the range of about 10 hours to about 14 hours.

In embodiment 12, any of embodiments 1-11 are modified, wherein the mixture is milled in a ball mill for a period of time in the range of about 30 minutes to about 60 minutes. Embodiment 13 pertains to a process for manufacturing nitrogen oxide storage materials, comprising preparing a mixture of Ba(OH)$_2$, CeO$_2$, and H$_2$O, wherein the Ba(OH)$_2$ is present in an amount up to the maximum solubility of Ba(OH)$_2$ in H$_2$O at the temperature of the H$_2$O, and CeO$_2$ is present in an amount of about 1.75 to about 2.0 times the amount of Ba(OH)$_2$ by weight; milling the mixture for a period of time in the range of about 30 minutes to about 60 minutes to provide a milled mixture;

drying the milled mixture at a temperature in the range of about 110° C. to about 140° C. for a period of time in the range of about 8 hours to about 18 hours to provide a dried, milled mixture; and calcining the dried, milled mixture at a temperature in the range of about 40° C. to about 700° C. for a period of time in the range of about 30 minutes to about 120 minutes. In embodiment 14, the embodiment of claim 13 is modified, wherein the mixture is milled in a ball mill.

In embodiment 15, any of embodiments 12-13 are modified, wherein the H$_2$O is at a temperature in the range of about 10° C. to about 80° C. for preparing the mixture, and Ba(OH)$_2$ is present in an amount in the range of about 25 g/L H$_2$O to about 1014 g/L H$_2$O corresponding to the solubility at the temperature of the H$_2$O.

In embodiment 16, any of embodiments 13-15 are modified, wherein the dried, milled mixture is calcined in a CO$_2$ gas atmosphere. In embodiment 17, embodiment 16 is modified, wherein at least a portion of the CO$_2$ gas in the calcining atmosphere is provided by substituting about 3% to about 15% by weight of the Ba(OH)$_2$ with Ba(OOCH$_3$)$_2$. In embodiment 18, embodiment 16 is modified, wherein the dried, milled mixture is calcined in a CO$_2$ gas atmosphere at a temperature in the range of about 400° C. to about 700° C. In embodiment 19, any of embodiments 13-18 are modified, wherein the dried, milled mixture is calcined at a temperature of about 650° C.

Embodiment 20 pertains to a process for manufacturing a nitrogen oxide storage material, comprising mixing Ba(OH)$_2$ with CeO$_2$ and H$_2$O to provide a mixture, wherein the Ba(OH)$_2$ is present in an amount up to the maximum solubility of Ba(OH)$_2$ in H$_2$O at the temperature of the H$_2$O, and CeO$_2$ is present in an amount of about 1.75 to about 2.0 times the amount of Ba(OH)$_2$ by weight; milling the mixture for a period of time in the range of about 30 minutes to about 60 minutes in a ball mill to provide a milled mixture; drying the milled mixture at a temperature in the range of about 110° C. to about 140° C. for a period of time in the range of about 8 hours to about 18 hours to provide a dried, milled mixture; and calcining the dried, milled mixture at a temperature in the range of about 200° C. to about 700° C. for a period of time in the range of about 60 minutes to about 120 minutes under a $CO_2$ gas atmosphere.

Embodiment 21 pertains to the nitrogen oxide storage material produced by the process of embodiment 20. Embodiment 22 pertains to the nitrogen oxide storage material of embodiment 21 characterized in that the material has an average particle size in the range of about 2 microns to about 8 microns, and a BET surface area of greater than 40 $m^2/g$. Embodiment 23 pertains lean $NO_x$ trap (LNT) catalyst comprising the nitrogen oxide storage material of embodiments 21 or 22.

Embodiment 24 pertains to the LNT catalyst of embodiment 23, wherein the catalyst comprises a layer of LNT catalyst material on a honeycomb substrate.

According to embodiments of the invention, methods of manufacturing $NO_x$ storage materials and catalytic traps including these storage materials are provided. Other embodiments of the invention pertain to a catalytic trap for abatement of NO, in an exhaust gas stream which is generated by an internal combustion engine which is operated periodically between lean and stoichiometric or rich conditions. According to one or more embodiments, the catalytic trap comprises a catalytic trap material including a catalytic article effective for promoting the reduction of $NO_x$ under stoichiometric or rich conditions supported on a refractory metal oxide and a $NO_x$ storage material effective for adsorbing the $NO_x$ under lean conditions and desorbing and reducing the $NO_x$ to nitrogen under stoichiometric or rich conditions, the $NO_x$ storage material comprising barium carbonate produced from barium hydroxide supported on the ceria particles, the catalytic trap material being disposed on a refractory carrier member.

In one or more embodiments of the present invention, the catalytic article may comprise a precious metal component, e.g., a platinum group metal component. Suitable platinum group metal components include platinum, palladium, rhodium and mixtures thereof. The platinum group metal component will typically be present in an amount of about 20 to about 200 $g/ft^3$, more specifically, about 60 to 120 $g/ft^3$.

Nitrates formed on different support materials may be thermally decomposed at different temperatures. Table 1 shows the thermal decomposition of nitrates formed on 24% $BaCO_3/CeO_2$, 24% $BaCO_3$/gamma $Al_2O_3$, gamma $Al_2O_3$, and $CeO_2$, as compared to bulk $Ba(NO_3)_2$. The materials carry 1% Pt and 0.2% Pd and are hydrothermally aged for 5 h at 800° C. and the $NO_x$ adsorption was achieved by a feed of $NO_x$ in air over powder samples until 80% of saturation was accomplished. As can be seen in Table 1, barium nitrate formed on $CeO_2$ is almost as stable as bulk barium nitrate, where barium nitrate formed on $CeO_2$ has a decomposition temperature of 550° C. compared to 580° C. for bulk barium nitrate, barium nitrate formed on $Al_2O_3$ is less stable, and barium nitrate formed on pure $CeO_2$ is much less stable.

TABLE 1

| Material Hydrothermally Aged 5 hrs at 800° C. | Thermal peak decomposition temperature of adsorbed $NO_x$ in air/° C. | Amount of $NO_x$ adsorption at 300° C. as % of weight |
| --- | --- | --- |
| 24% $BaCO_3/CeO_2$ | 550 | 4.9 |
| 24% $BaCO_3$/gamma $Al_2O_3$ (SBA150, Sasol) | 500 | 2.8 |
| gamma $Al_2O_3$ | 400 | 1.5 |
| $CeO_2$ | 300 | 0.16 |
| Bulk $Ba(NO_3)_2$ (Ref. 1, no Pt/Pd) | 580 | 58 |

In one or more embodiments, the $BaCO_3$ may be prepared from barium hydroxide ($Ba(OH)_2$), where the $Ba(OH)_2$ may be provided as $Ba(OH)_2$ (anhydrous), $Ba(OH)_2 \cdot H_2O$ (monohydrate), or $Ba(OH)_2 \cdot 8H_2O$ (octahydrate). Barium hydroxide has a molar mass of 171.34 g/mol in anhydrous form, 189.39 g/mol in the monohydrate form, and 315.46 g/mol in the octahydrate form.

In one or more embodiments, the $BaCO_3$ is supported on the $CeO_2$.

A process for manufacturing barium carbonate ($BaCO_3$) supported on ceria ($CeO_2$) can involve weighing out an amount of solid $Ba(OH)_2$ and an amount of $CeO_2$ components, combining the solid $Ba(OH)_2$ and $CeO_2$, and adding an amount of $H_2O$ to the solid component(s) to provide a mixture. The amount of solid $Ba(OH)_2$ added to the mixture may dissolve completely in the $H_2O$.

The process may further comprise mixing the $Ba(OH)_2$ with $CeO_2$ and $H_2O$ to provide a mixture. In one or more embodiments, the $Ba(OH)_2$, as $Ba(OH)_2$ (anhydrous), $Ba(OH)_2 \cdot H_2O$ (monohydrate), and/or $Ba(OH)_2 \cdot 8H_2O$ (octahydrate), may be mixed with $CeO_2$ and $H_2O$ to provide a mixture. Mixing the amount of solid $Ba(OH)_2$, the amount of $CeO_2$, and the amount of $H_2O$ may be done in a mill. In various embodiments, no other source of barium is added to the mixture, so the mixture of $Ba(OH)_2$, $CeO_2$, and $H_2O$ consists essentially of $Ba(OH)_2$, $CeO_2$, and $H_2O$. In various embodiments, the source of barium may comprise $Ba(OH)_2$ and BaOAc. In various embodiments, barium oxalate is not substituted for $Ba(OH)_2$ or added to the mixture.

In one or more embodiments, the amount of anhydrous $Ba(OH)_2$ in the mixture of $Ba(OH)_2$, $CeO_2$, and $H_2O$ is in the range of 2% to about 15% by weight, or about 4% to about 12%, or about 6% to about 10%, and the amount of $H_2O$ in the mixture of $Ba(OH)_2$, $CeO_2$, and $H_2O$ is in the range of 30% to about 50% by weight, or in the range of 40% to about 50% by weight, and the mixture of $Ba(OH)_2$, $CeO_2$, and $H_2O$ total 100%. In various embodiments, the amount of $Ba(OH)_2$ in the mixture of $Ba(OH)_2$, $CeO_2$, and $H_2O$ is in the range of 2% to about 15% by weight, or about 4% to about 12%, or about 6% to about 10%, or about 10% to about 15% by weight, and the amount of $CeO_2$ in the mixture of $Ba(OH)_2$, $CeO_2$, and $H_2O$ is in the range of about 35% to about 45% by weight or 40% to about 50%, or in the range of about 43% to about 45%, or about 43%, and the mixture of $Ba(OH)_2$, $CeO_2$, and $H_2O$ total 100%. If monohydrate and/or octahydrate $Ba(OH)_2$ are used to prepare the mixture, the calculation may be adjusted to provide the same amount of anhydrous $Ba(OH)_2$.

In one or more embodiments, the $Ba(OH)_2$ is dissolved in the $H_2O$ up to the maximum solubility of $Ba(OH)_2$ in $H_2O$ at the temperature of the $H_2O$. In various embodiments, the $H_2O$ used to form the mixture of $Ba(OH)_2$, $CeO_2$, and $H_2O$ is at a temperature in the range of about 5° C. to about 100°

C. or at a temperature in the range of about 10° C. to about 90° C., or at a temperature in the range of about 10° C. to about 80° C., or at a temperature in the range of about 25° C. to about 80° C., or at a temperature in the range of about 40° C. to about 80° C., or at a temperature in the range of about 50° C. to about 80° C., or at a temperature in the range of about 50° C. to about 75° C. In various embodiments, the $Ba(OH)_2$ is present in an amount in the range of about 25 g/L $H_2O$ to about 1014 g/L $H_2O$ corresponding to the solubility of the $Ba(OH)_2$ at the temperature of the $H_2O$. In various embodiments, the ceria makes up the weight % of the mixture.

In one or more embodiments, the process comprises mixing of $Ba(OH)_2$ and $CeO_2$ with water in a ball mill to provide a mixture. A milling process may be a wet milling process in which water is added to the mixture of $Ba(OH)_2$ and $CeO_2$ solids. In various embodiments, the mixture is ground/pulverized to provide size reduction and mixing of the $Ba(OH)_2$ and $CeO_2$ particles, where the mixture may be ground/pulverized in a ball mill.

In one or more embodiments, the mixture of $Ba(OH)_2$ and $CeO_2$ with water is milled in a ball mill for a period of time in the range of about 30 minutes to about 60 minutes, or for about 45 minutes.

In one or more embodiments, the mixture is dried to remove water from the mixture. The drying may be done at a temperature in the range of about 100° C. to about 150° C., or in the range of about 110° C. to about 140° C., or in the range of about 110° C. to about 130° C., or in the range of about 125° C. to about 135° C., or at about 130° C. to provide a dried mixture. The mixture may be dried subsequent to the milling process.

In one or more embodiments, the mixture is dried for a period of time in the range of about 8 hours to about 18 hours, or in the range of about 8 hours to about 12 hours, or in the range of about 10 hours to about 14 hours, or about 10 hours to about 12 hours.

In one or more embodiments, the dried mixture of $Ba(OH)_2$ and $CeO_2$ may be calcined at a temperature in the range of about 40° C. to about 750° C., or at a temperature in the range of about 40° C. to about 700° C., or at a temperature in the range of about 40° C. to about 450° C., or at a temperature in the range of about 50° C. to about 350° C., or at a temperature in the range of about 350° C. to about 750° C., or at a temperature in the range of about 400° C. to about 700° C., or at a temperature in the range of about 450° C. to about 650° C. The dried mixture of $Ba(OH)_2$ and $CeO_2$ may be calcined to convert the $Ba(OH)_2$ to BaO and/or form a stabilized barium oxide (BaO) dispersed onto the $CeO_2$. In various embodiments, the mixture is calcined to form particles of ceria having barium carbonate supported on the ceria particles. In various embodiments, a mixture of 20% BaO and 80% $CeO_2$ is produced.

In one or more embodiments, the dried mixture of $Ba(OH)_2$ and $CeO_2$ may be heated from room temperature to the calcining temperature over a period of about 150 minutes to about 210 minutes, or over a period of about 160 minutes to about 200 minutes, or over a period of about 170 minutes to about 190 minutes, or over a period of about 180 minutes.

In one or more embodiments, the mixture of $Ba(OH)_2$ and $CeO_2$ may be calcined for a period of time in the range of about 30 minutes to about 120 minutes, or about 45 minutes to about 90 minutes, or about 45 minutes to about 75 minutes, or about 50 minutes to about 70 minutes, or about 60 minutes.

In one or more embodiments, the mixture of $Ba(OH)_2$ and $CeO_2$ may be calcined in an air atmosphere. In one or more embodiments, the mixture of $Ba(OH)_2$ and $CeO_2$ may be calcined in an air atmosphere with an elevated $CO_2$ concentration. In one or more embodiments, the mixture of $Ba(OH)_2$ and $CeO_2$ may be calcined in a $CO_2$ atmosphere. In various embodiments, the concentration of $CO_2$ in the air atmosphere may be in the range of about 0.03% to about 100%, or about 0.04% to about 100%, or about 1% to about 75%, or about 1% to about 50%, or about 5% to about 50%, or about 10% to about 50%, or about 20% to about 50%, or about 25% to about 50%, or about 0.03% to about 0.04%, or about 95% to about 100%, or may be ≤100%, or about 100%. In one or more embodiments, the dried, milled mixture is calcined in a 100% $CO_2$ gas atmosphere.

In an exemplary embodiment of a process for manufacturing nitrogen oxide storage materials, the process comprises preparing a mixture of $Ba(OH)_2$, $CeO_2$, and $H_2O$, wherein the $Ba(OH)_2$ is present in an amount up to the maximum solubility of $Ba(OH)_2$ in $H_2O$ at the temperature of the $H_2O$, and $CeO_2$ is present in an amount of about 1.75 to about 2.0 times the amount of $Ba(OH)_2$ by weight;

milling the mixture for a period of time in the range of about 30 minutes to about 60 minutes to provide a milled mixture;

drying the milled mixture at a temperature in the range of about 110° C. to about 140° C. for a period of time in the range of about 8 hours to about 18 hours;

and calcining the dried, milled mixture at a temperature in the range of about 40° C. to about 700° C. for a period of time in the range of about 30 minutes to about 120 minutes.

In various embodiments, the $H_2O$ may be at a temperature in the range of about 10° C. to about 80° C. for preparing the mixture, and the $Ba(OH)_2$ is present in the $H_2O$ at an amount in the range of about 25 g/L $H_2O$ to about 1014 g/L $H_2O$ corresponding to the solubility of the $Ba(OH)_2$ at the temperature of the $H_2O$. In one or more embodiments, the milling of the mixture is in a ball mill.

In another exemplary embodiment of a process for manufacturing nitrogen oxide storage material, the process comprises mixing $Ba(OH)_2$ with $CeO_2$ and $H_2O$, wherein the $Ba(OH)_2$ is present in an amount up to the maximum solubility of $Ba(OH)_2$ in $H_2O$ at the temperature of the $H_2O$, and $CeO_2$ is present in an amount of about 1.75 to about 2.0 times the amount of $Ba(OH)_2$ by weight;

milling the mixture for a period of time in the range of about 30 minutes to about 60 minutes in a ball mill to provide a milled mixture;

drying the milled mixture at a temperature in the range of about 110° C. to about 140° C. for a period of time in the range of about 8 hours to about 18 hours;

and calcining the dried, milled mixture at a temperature in the range of about 200° C. to about 700° C. for a period of time in the range of about 60 minutes to about 120 minutes under a $CO_2$ gas atmosphere.

In one or more embodiments, at least a portion of the $CO_2$ gas in the calcining atmosphere is provided by substituting about 3% to about 15% by weight of the $Ba(OH)_2$ with $Ba(OOCH_3)_2$.

In one or more embodiments, the mixture produced by a process as described herein may be used as a nitrogen oxide storage material. In various embodiments, the nitrogen oxide storage material has an average particle size in the range of about 2 microns to about 8 microns, and a BET surface area of greater than 40 $m^2/g$.

In one or more embodiments, the $BaCO_3/CeO_2$ produced with $Ba(OH)_2$ has a BET surface area in the range of about 40 m²/g to about 100 m²/g, or about 50 m²/g to about 100 m²/g, or about 65 m²/g to about 95 m²/g, or about 75 m²/g to about 95 m²/g, or about 80 m²/g to about 95 m²/g, or about 40 m²/g to about 80 m²/g, or about 50 m²/g to about 80 m²/g, or about 50 m²/g to about 60 m²/g. In various embodiments, the BaCO$_3$/CeO$_2$ produced with Ba(OH)$_2$ has a BET surface area in the range of about 50 m²/g to about 60 m²/g to provide a combination of activity and stability to hydrothermal aging. It has been observed that the higher the initial surface area, the lower the surface area after hydrothermal aging.

In one or more embodiments, the nitrogen oxide storage material may be applied to a substrate to form a lean NO$_x$ trap (LNT) catalyst comprising the nitrogen oxide storage material. In various embodiments, the lean NO$_x$ trap catalyst may further comprise a platinum group metal component.

The LNT catalyst can be readily prepared in layers on a monolithic honeycomb substrate. For the bottom layer, finely divided particles of a high surface area refractory metal oxide such as gamma alumina are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide, e.g., about 0.5 to about 3.0 g/in³. Components such as the platinum group metals, transition metal oxides, stabilizers, promoters and the NO$_x$ sorbent component may be incorporated in the slurry as a mixture of water soluble or water-dispersible compounds or complexes. Thereafter the coated substrate is calcined by heating, e.g., at 400 to 600° C. for 1 to 3 hours.

Typically, the platinum group metal component, e.g., platinum component, is dispersed on the refractory metal oxide, e.g., activated alumina, using a platinum group metal salt or complex (or platinum group metal precursor). For the purposes of the present invention, the term "platinum group metal precursor" means any compound, complex, or the like which, upon calcination or use thereof, decomposes or otherwise converts to a catalytically active form, usually the metal or the metal oxide. Generally, both from the point of view of economics and environmental aspects, aqueous solutions of soluble compounds or complexes of the platinum-group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

As used herein, the term "substrate" refers to the monolithic material onto which the catalyst is placed, typically in the form of a washcoat. A washcoat is formed by preparing a slurry containing a specified solids content (e.g., 30-90% by weight) of catalyst material in the form of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. In specific embodiments, the washcoat is provided by immersing the substrate in a slurry, drying the substrate at a first temperature and calcining at a second temperature higher than the first temperature.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, a-alumina, an aluminosilicate and the like.

The substrates useful for the catalyst of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component.

EXAMPLES

Testing of the BaCO$_3$ supported on CeO$_2$ prepared under different conditions was conducted to determine the comparative change in BET surface area, particle size, and weight of the components. Table 2 summarizes the results for testing of BET surface area, XRD crystallite sizes and BaOH, BaCO$_3$ and BaCeO$_3$ quantities under various calcination conditions. As can be seen in table 2, the BET surface area decreases with increasing calcination temperature, where the BET surface area shrinks in proportion to the increase of the BaCO$_3$ crystallite size and the ceria crystallite size.

The weight loss analysis during the thermal decomposition of the samples is used to derive the amount of H$_2$O, Ba(OH)$_2$, BaCO$_3$ and BaCeO$_3$ produced. According to the data the amount of BaCO$_3$ increases at the expense of Ba(OH)$_2$ under calcination at 400° C. This indicates the reaction of BaO with CO$_2$ from the air (equation 1, shown below). At higher temperatures the BaCO3 quantity decreases and the BaCeO$_3$ concentration increases. This indicates the reaction of barium carbonate and barium oxide with ceria (equation 2, shown below), and this reaction is accompanied with a significant reduction in BET surface area and an increase of the BaCO$_3$ and CeO$_2$ crystallite size.

$$BaO + CO_2 \leftrightarrow BaCO_3 + H_2O \quad (1)$$

$$BaCO_3 + CeO_2 \leftrightarrow BaCeO_3 + CO_2 \quad (2)$$

Under calcination with a $CO_2$ gas atmosphere, the BET surface area remains stable up to 700° C. and there is almost no or no formation of undesired and inactive $BaCeO_3$. This is in conformity to the law of mass action for reaction equation 2; i.e. the higher $CO_2$ partial pressure helps avoid the formation of $BaCeO_3$ and thus slows down the sintering of ceria and $BaCO_3$. In the case of including BaOAc in the mixture, the thermal decomposition and combustion of acetate leads to $CO_2$ formation and thus slows down the sintering process.

TABLE 2

| Components | Sample No. | Calcine Temp. | Calcine Atmos. | BET m²/g | XRD Size (nm) BaCO₃ | XRD Size (nm) CeO₂ | Amt. % BaOH | Amt. % BaCO₃ | Amt. % BaCeO₃ |
|---|---|---|---|---|---|---|---|---|---|
| Ba(OH)₂ + CeO₂ | 1 | 50° C. | air | 95 | 26 | 6.2 | 1.5 | 1 | 0 |
| Ba(OH)₂ + CeO₂ | 2 | 400° C. | air | 92 | 32 | 6.2 | 1.3 | 2 | 0 |
| Ba(OH)₂ + CeO₂ | 3 | 500° C. | air | 38.6 | 36 | 8.5 | 1.3 | 0.5 | 0.7 |
| Ba(OH)₂ + CeO₂ | 4 | 550° C. | air | 29.6 | 35 | 10 | 1 | 0.8 | 0.7 |
| Ba(OH)₂ + CeO₂ | 5 | 600° C. | air | 24.5 | 37 | 12 | 0.5 | 0.5 | 1.5 |
| Ba(OH)₂ + CeO₂ | 6 | 650° C. | air/CO₂ | 76.9 | 23.7 | 7.1 | 0.9 | 2.8 | 0 |
| Ba(OH)₂ + CeO₂ | 7 | 700° C. | air/CO₂ | 66.8 | 24 | 7.7 | 1.2 | 4.2 | 0 |
| BaOAc + CeO₂ | 8 | 750° C. | air | 51 | 30 | 7.4 | 0.5 | 2 | 0 |
| BaOAc + CeO₂ | 9 | 850° C. | air | 55 | 28 | 7.3 | 0.5 | 2.2 | 0 |
| BaOOx + CeO₂ | 10 | 950° C. | air | 42 | 53 | 12 | 0 | 2.5 | 0 |

For comparative examples, the same experiments were performed using barium acetate and barium oxalate. In the case of barium acetate, 30 g of barium acetate (anhydrous), with a molar mass of 255.415 g/mol, are mixed with 65 g of ceria (anhydrous). In the case of barium oxalate 25 g of barium oxalate are mixed with 65 g of ceria and 50 g of water. The BaOx is not soluble in the water; therefore, BaOx particles remain stable during milling and form relative large $BaCO_3$ particles under calcination.

In a non-limiting example of the preparation of $BaCO_3$ supported on $CeO_2$, 35 grams of barium hydroxide as $Ba(OH)_2 \cdot 8H_2O$ (octahydrate) with a molar mass of 315.46 g/mol is mixed with 65 grams of $CeO_2$ with a molar mass of 172.115 g/mol, and 50 g of water ($H_2O$) in a ball mill (Retsch mill) for 45 minutes. Subsequently, the mixture is dried at 130° C. in air overnight and afterwards calcined for 60 min, where calcination may be under different conditions (e.g., different calcination temperatures, $CO_2$ atmosphere). The heating rate from room temperature to the target temperature for calcining is 3 hours. With the above concentration, a mixture of 20% BaO and 80% $CeO_2$ is established. This corresponds to a mixture of 23.4% $BaCO_3$ and 76.6% $CeO_2$ if all BaO is transformed into $BaCO_3$.

As another non-limiting example, $BaCO_3$ and $CeO_2$ were intimately mixed and finely dispersed in a weight ratio of $Ba(OH)_2$-to-$CeO_2$ in the range of about 1:2 to about 1:6. In various embodiments, the cerium oxide may have a BET surface area of between about 50 to about 150 m²/g, or about 75 to about 100 m²/g, was mixed with a solution of barium hydroxide such that the $BaCO_3/CeO_2$ composite had a $BaCO_3$ content of about 10-30 wt %. After mixing, the suspension of soluble barium acetate and $CeO_2$ was then dried at a temperature of between about 90° C. and 120° C. to obtain a solid mixture of barium acetate and ceria.

In order to avoid or reduce the feed/amount of $CO_2$ gas into a combustion chamber, barium acetate may be added to the $Ba(OH)_2$/ceria mixture to form $CO_2$ in situ during the decomposition of Barium acetate.

$$Ba(H_3C_2O_2)_2 + 2O_2 + \Delta T \rightarrow BaCO_3 + CO_2 + 3H_2O \quad (3)$$

In one or more embodiments, barium acetate (BaOAc) may be substituted for a portion of the $Ba(OH)_2$ to provide a source of $CO_2$ in the mixture. In various embodiments, the amount of BaOAc may be greater than 9% but ≤25%, or ≤20%, or ≤15% of the $Ba(OH)_2$ by weight. In various embodiments, at least a portion of the $CO_2$ gas in the calcining atmosphere is provided by substituting about 10% to about 25%, 10% to about 15%, or about 15% to about 25% by weight of the $Ba(OH)_2$ with $Ba(OOCH_3)_2$. In one or more embodiments, the amount of BaOAc included in the mixture is about 20% to about 25%, or about 15% to about 25%, or about 12% to about 25%, or about 10% to about 25%, by weight with the remaining percentage of Ba for formation of BaO provided as $Ba(OH)_2$.

In an exemplary embodiment, 5% and 10% of the $Ba(OH)_2$ was exchanged for BaOAc and mixed with the water and ceria as described above and dried and calcined at different temperatures. The result of the analysis of the calcined samples is summarized in table 3. In presence of 10% of the BaO amount as Barium acetate all BaO can be converted to $BaCO_3$ by calcination for 1 hour at 650° C. in air. At a BaOAc concentration of 5%, $Ba(OH)_2$ is remaining and the reaction with the ceria occurs at 700° C. Thus the desired product can be prepared with a preferred calcination temperature of 650° C.

Table 3: Calcination of $Ba(OH)_2$/BaOAc mixtures at different temperatures. In one or more embodiments, the dried mixture of $Ba(OH)_2$, $CeO_2$, and $H_2O$ is calcined in a 100% $CO_2$ gas atmosphere at a temperature in the range of about 400° C. to about 700° C.

TABLE 3

| Process | Calcine Temp. °C. | BET m²/g | XRD Size nm BaCO₃ | XRD Size nm CeO₂ | DTA Results (%) H₂O <250° C. | DTA Results (%) BaOH | DTA Results (%) BaCO₃ | DTA Results (Est. %) BaCeO₃ |
|---|---|---|---|---|---|---|---|---|
| 95% BaOH, 5% BaOAc | 700 | 16.7 | 51.6 | 13.9 | 0.6 | 0.4 | 4 | 1 |
| 90% BaOH, 10% BaOAc | 700 | 46.4 | 41.8 | 7.1 | 1.6 | 0.6 | 3.8 | 0 |
| 95% BaOH, 5% BaOAc | 650 | 25.8 | 46.8 | 10.6 | 1 | 0.7 | 3 | 0 |
| 90% BaOH, 10% BaOAc | 650 | 65.3 | 19.0 | 5.7 | 2 | 1 | 3.3 | 0 |
| 95% BaOH, 5% BaOAc | 600 | 58.9 | 43.9 | 5.8 | 2.7 | 1.2 | 3 | 0 |
| 90% BaOH, 10% BaOAc | 600 | 73.8 | 38.1 | 5.4 | 3 | 1 | 3 | 0 |
| BaOAc + CeO₂ | 750 | 51 | 30 | 7.4 | 2 | 0.5 | 2 | 0 |

In one or more embodiments, the dried mixture of Ba(OH)$_2$, Ba(OOCH3)$_2$, CeO$_2$, and H$_2$O is calcined in a 100% CO$_2$ gas atmosphere at a temperature in the range of about 400° C. to about 700° C. The mixing of Ba(OH)$_2$ and CeO$_2$ with water in a ball mill with subsequent calcination under CO$_2$ at 700° C. leads to a homogeneous mixture of BaCO$_3$ and CeO$_2$. In various embodiments, the mixture of Ba(OH)$_2$, Ba(OOCH$_3$)$_2$, CeO$_2$, and H$_2$O is calcined in a CO$_2$ gas atmosphere having a concentration in the range of about 0.5% to about 15% CO$_2$ gas, or about 1% to about 12% CO$_2$ gas, or about 1% to about 10% CO$_2$ gas, or about 2% to about 10% CO$_2$ gas. In various embodiments, 1 to 10% CO$_2$ in the calcination atmosphere is sufficient to yield 100% BaCO$_3$.

In an exemplary embodiment, the dried mixture is calcined at a temperature of about 650° C. In another exemplary embodiment, the dried mixture is calcined at a temperature of about 600° C.

One or more embodiments of the invention pertain to nitrogen oxide storage materials prepared by any of the processes described herein. Nitrogen oxide storage materials according to one or more embodiments can have an average particle size in the range of about 2 microns to about 8 microns, and a BET surface area of greater than 40 m²/g.

In one or more embodiments, the nitrogen oxide storage materials comprise ceria particles having barium oxide supported on the particles, where the ceria has a crystallite size of between about 5 and 15 nm and the barium oxide has a crystallite size of between about 20 and 40 nm.

Embodiments of the invention pertain to a lean NO$_x$ trap (LNT) catalyst comprising the nitrogen oxide storage material described above and/or made according to the processes described herein. The LNT catalyst may comprise a layer of LNT catalyst material on a honeycomb substrate.

Figure 1:
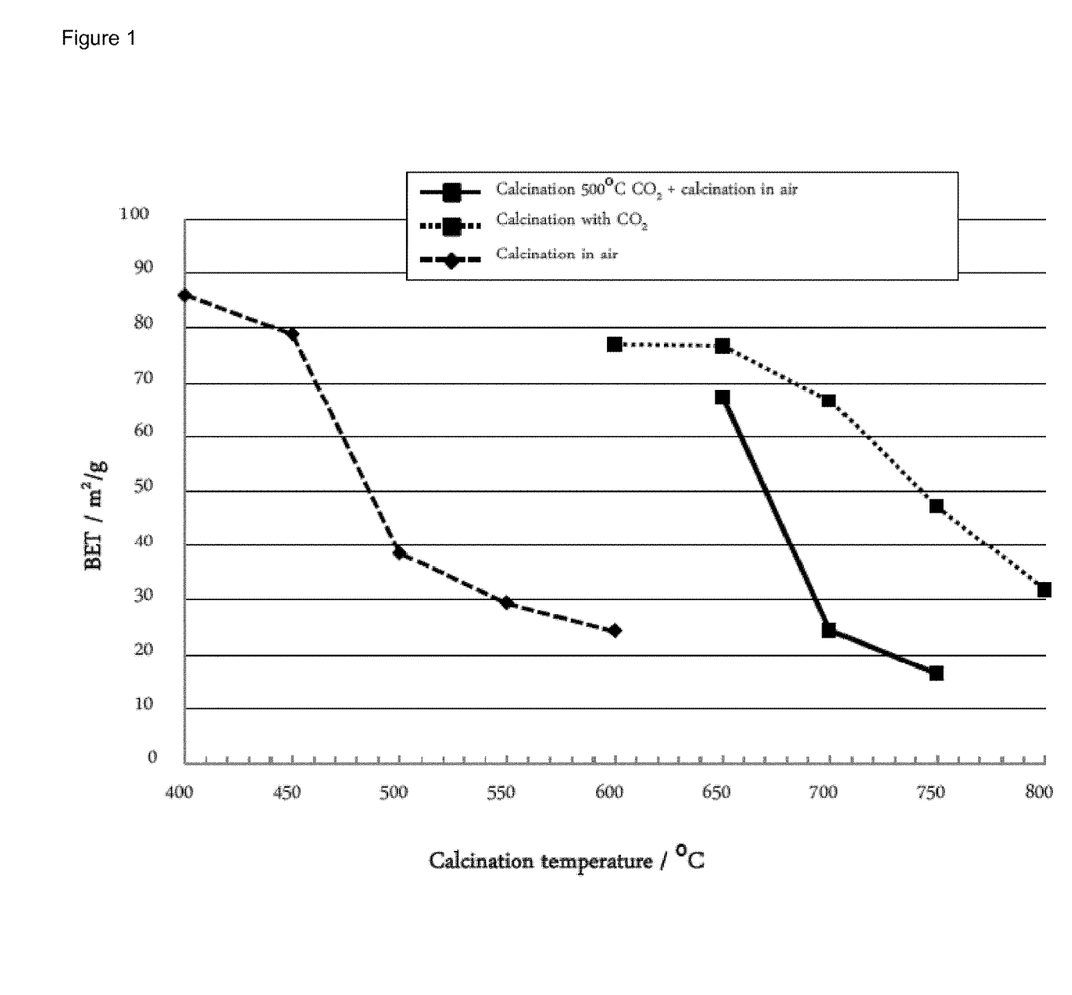
FIG. 1 is a graph showing surface area versus calcination temperature for samples calcined in different environments.

In reference to the figures, FIG. 1 shows the BET surface areas as function of the different calcination temperatures under air at varying temperatures, in 100% CO$_2$ at varying temperatures, and in 100% CO$_2$ at 500° C. and in air at varying temperatures. The data for calcination under air shows the BET surface areas decrease rapidly at temperatures above 450° C. The BET surface area was measured by nitrogen adsorption.

FIG. 1 shows that the BET surface area decreases significantly at temperatures above 650° C. The data for calcination in CO$_2$ shows the BET surface area as decreasing above 650° C., but at a lower rate compared to the other two samples.

Figure 2:
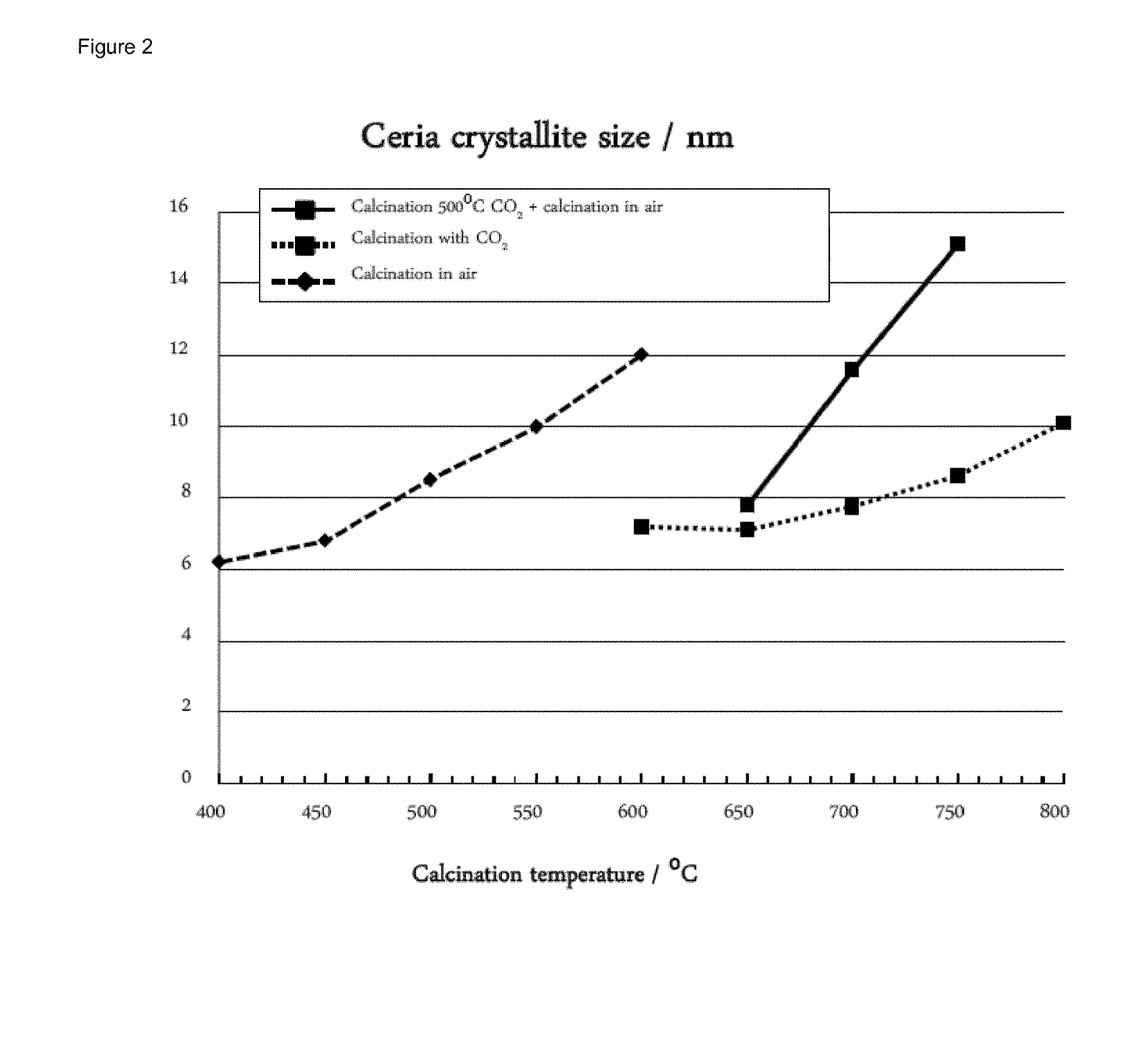
FIG. 2 is a graph showing ceria crystallite size versus calcination temperature for samples calcined in different environments.
Figure 3:
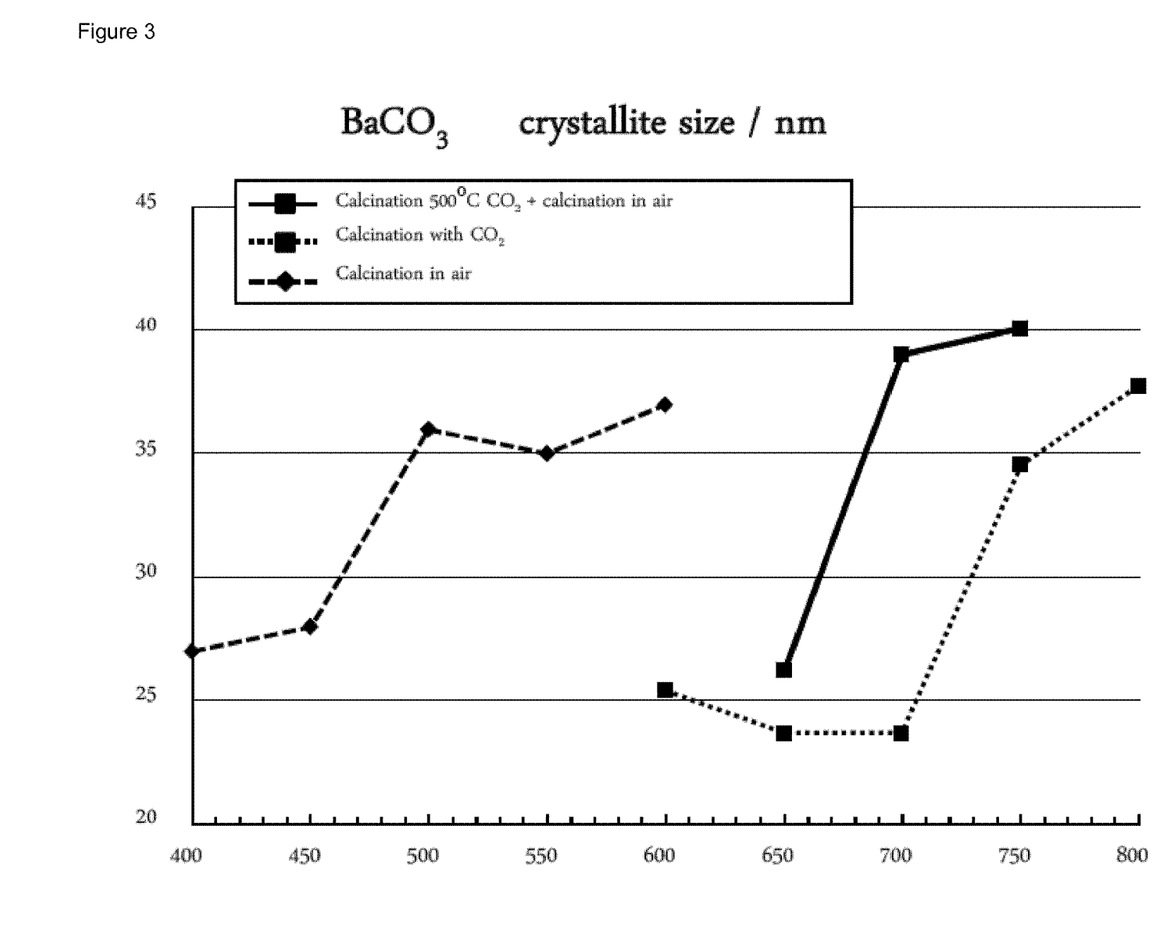
FIG. 3 is a graph showing barium carbonate crystal size versus calcination temperature for samples calcined in different environments.

FIG. 2 shows the ceria crystallite size and FIG. 3 shows the BaCO$_3$ crystallite size as function of the calcination temperatures under conditions 1-3. FIGS. 2 and 3 show that the ceria crystallite size increases proportional to the reduction in BET surface area. The BaCO$_3$ sintering is proportional to the BET surface area under conditions which included calcination in air or air and CO$_2$, but appears to be stronger for the sample calcined in CO$_2$ only. The crystallite sizes were evaluated by X-ray diffraction via the line broadening effect of the diffraction pattern with decreasing particle size.

Figure 4:
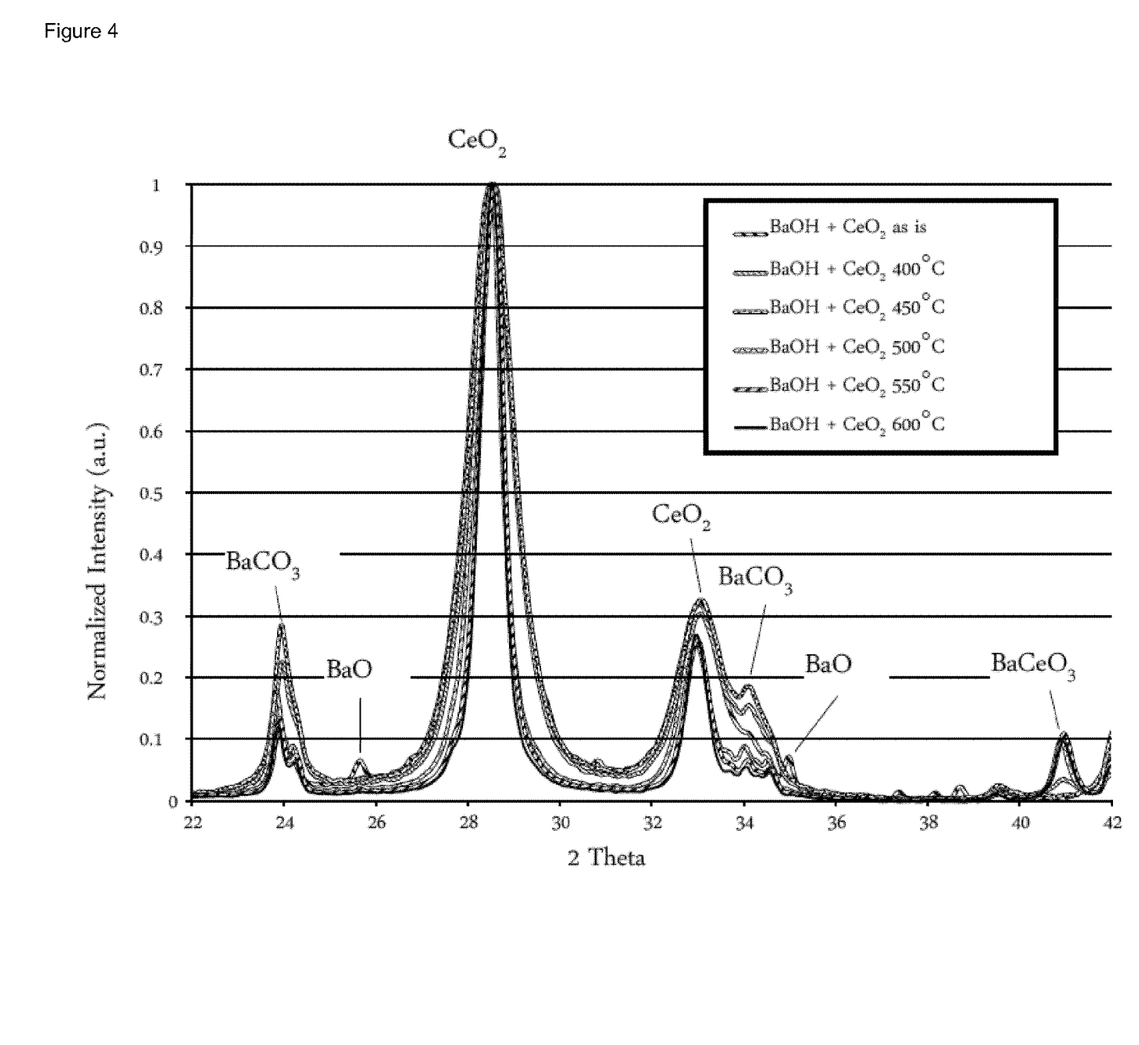
FIG. 4 shows the X-ray diffraction data of $BaOH/CeO_2$ mixtures calcined in different conditions.

FIG. 4 shows the X-ray diffraction data of BaOH/CeO$_2$ mixtures calcined in different conditions. The particular lines are shown in gray, where each line reflects the data from the mixture after treatment with the ball mill. It shows reflections from BaCO$_3$, BaO and ceria. Upon calcination with increasing temperatures the BaO diffraction disappears and the BaCO$_3$ and ceria diffraction become narrower. Already after calcination at 400° C. a diffraction pattern from BaCeO$_3$ appears that becomes more intense at higher temperatures.

Figure 5:
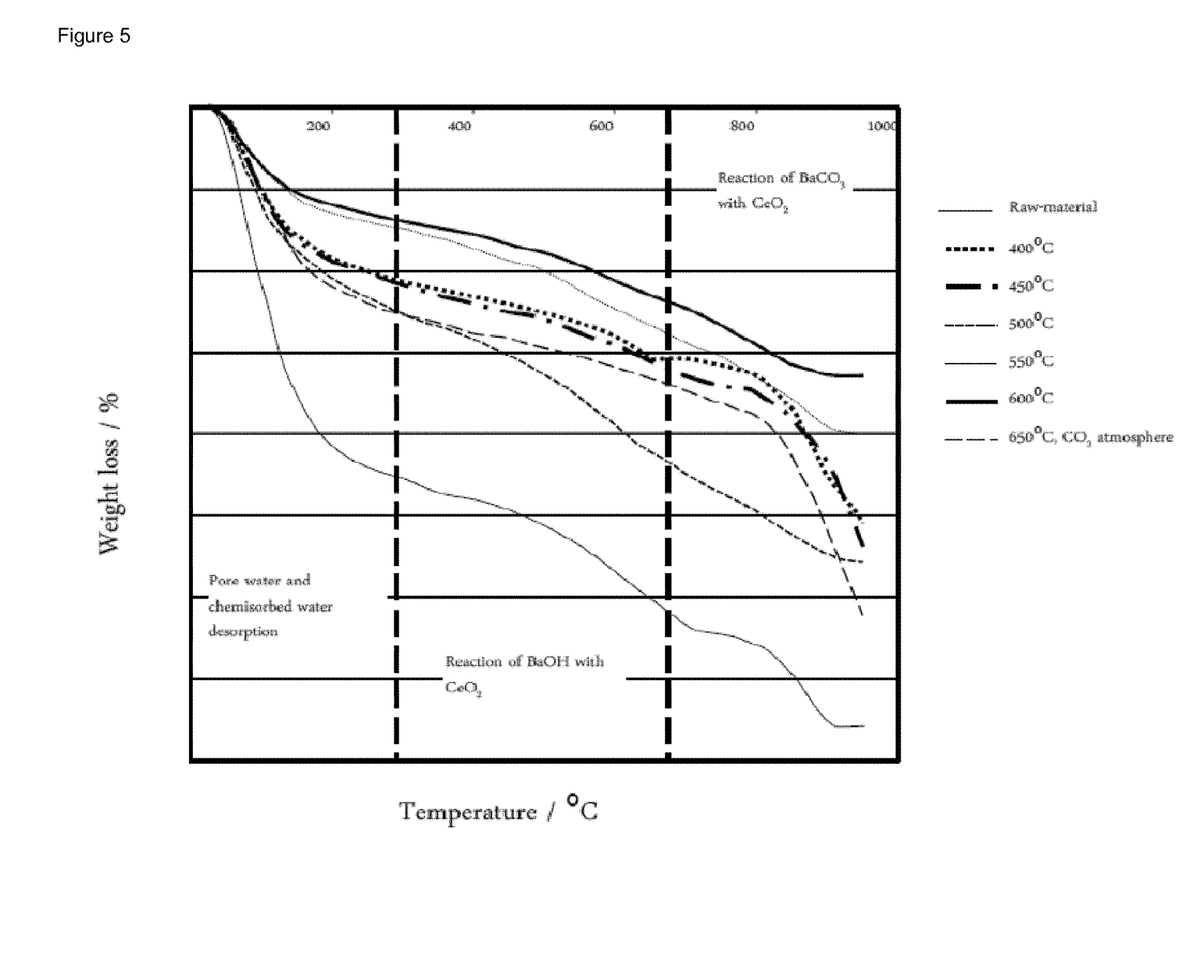
FIG. 5 is a graph showing thermal weight loss of BaOH/CeO$_2$ mixtures calcined in different conditions.

FIG. 5 shows thermal weight loss of BaOH/CeO$_2$ mixtures calcined in different conditions. As indicated in the graph in the temperature range from 50° C. to 250° C., it was observed that the weight loss was associated with the evaporation of pore water and chemisorbed water. In the temperature range from 250° C. to 650° C. it was observed that the weight loss was associated with the changes represented by reaction (4):

$$Ba(OH)_2 + CeO_2 \leftrightarrow BaCeO_3 + H_2O \quad (4)$$

Eventually, at temperatures >650° C. it was observed that the weight loss was due to reaction (2) above, i.e. the loss of CO$_2$ from the reaction of BaCO$_3$ and CeO$_2$. A particular result in FIG. 5 is observed after calcination for 1 h at 650° C. under CO$_2$ atmosphere, which is shown as the dashed line. In this case the weight loss in the range from 250° C. and 650° C. is lowest and the weight loss above 650° C. is highest. The high weight loss >650° C. is associated with a high BaCO$_3$ concentration present.

Figure 6:
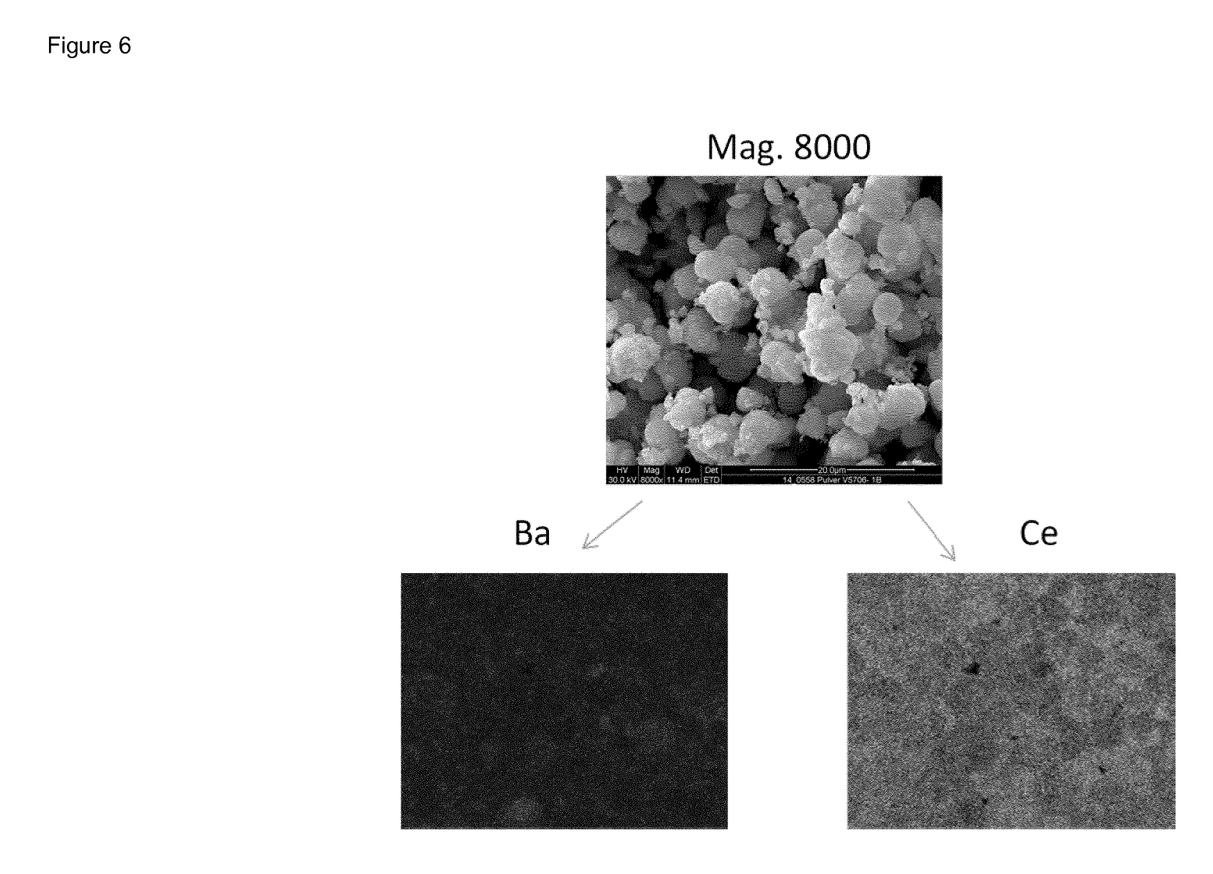
FIG. 6 shows an SEM image of a BaOH/CeO$_2$ sample calcined at 500° C.

FIG. 6 shows an SEM image of a BaOH/CeO$_2$ sample calcined at 500° C. The image shows particles with a 2-8 micron size, the smaller particles may be created by the milling procedure since the small 2 micron size particles are not seen in the not treated pure ceria. The comparison of the Energy-dispersive X-ray spectroscopy (EDX) scans indicates that the Ba—distribution over the ceria is very homogeneous.

Figure 7:
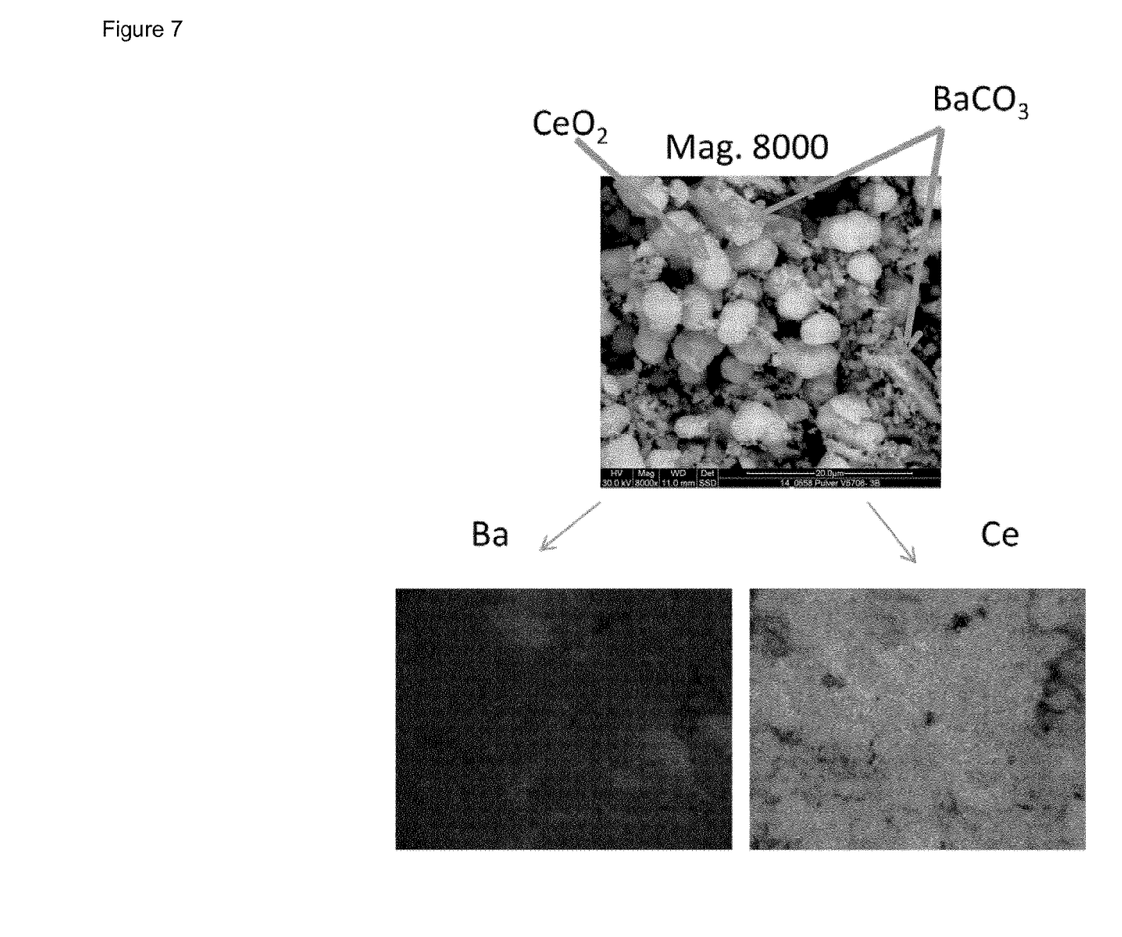
FIG. 7 shows the SEM image of a mixture of a BaOx and ceria mixture after calcination.

FIG. 7 shows the SEM image of a mixture of a BaOx and ceria mixture after calcination at 700° C. In this case particles in the range from 2-8 micron may also be seen, but with different shape. The particles with the cylindrical shape are BaCO$_3$ particles, while the ceria particles are spherical.

The EDX—mapping for Ba (left) and for ceria (right) reflect the heterogeneous structure of the sample.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

The invention claimed is:

1. A process for manufacturing barium carbonate ($BaCO_3$) supported on ceria ($CeO_2$), the process comprising:
   mixing $Ba(OH)_2$ with $CeO_2$ and $H_2O$ to provide a mixture;
   drying the mixture at a temperature in the range of about 100° C. to about 150° C. to provide a dried mixture; and
   calcining the dried mixture at a temperature in the range of about 40° C. to about 700° C.;
   wherein the dried mixture is calcined in an air atmosphere at a temperature in the range of about 40° C. to about 450° C. or wherein the dried mixture is calcine in a $CO_2$ gas atmosphere at a temperature in the range of about 400° C. to about 700° C.

2. The process of claim 1, wherein the dried mixture is calcined in an air atmosphere at a temperature in the range of about 40° C. to about 450° C.

3. The process of claim 1, wherein the dried mixture is calcined in a $CO_2$ as atmosphere at a temperature in the range of about 400° to about 700° C.

4. The process of claim 3, wherein the dried mixture is calcined for a period of time in the range of about 30 minutes to about 120 minutes.

5. The process of claim 4, wherein the dried mixture is calcined for a period of time in the range of about 45 minutes to about 75 minutes.

6. The process of claim 4, wherein the dried mixture is heated from room temperature to the calcining temperature over a period of about 150 minutes to about 210 minutes.

7. The process of claim 1, wherein an amount of $Ba(OH)_2$ in the mixture of $Ba(OH)_2$, $CeO_2$, and $H_2O$ is in the range of 2% to about 15% by weight, and an amount of $H_2O$ in the mixture of $Ba(OH)_2$, $CeO_2$, and $H_2O$ is in the range of 30% to about 50% by weight.

8. The process of claim 1, wherein an amount of $Ba(OH)_2$ in the mixture of $Ba(OH)_2$, $CeO_2$, and $H_2O$ is in the range of 10% to about 15% by weight, and an amount of $H_2O$ in the mixture of $Ba(OH)_2$, $CeO_2$, and $H_2O$ is in the range of 35% to about 45% by weight.

9. The process of claim 1, wherein the mixture is dried at a temperature in the range of about 125° C. to about 135° C. for a period of time in the range of about 8 hours to about 18 hours.

10. The process of claim 1, wherein the mixture is dried for a period of time in the range of about 10 hours to about 14 hours.

11. The process of claim 1, wherein the mixture is milled in a ball mill for a period of time in the range of about 30 minutes to about 60 minutes.

12. A process for manufacturing a nitrogen oxide storage material, the process comprising:
   preparing a mixture of $Ba(OH)_2$, $CeO_2$, and $H_2O$, wherein $Ba(OH)_2$ is present in an amount up to the maximum solubility of $Ba(OH)_2$ in $H_2O$ at the temperature of the $H_2O$, and $CeO_2$ is present in an amount of about 1.75 to about 2.0 times the amount of $Ba(OH)_2$ by weight;
   milling the mixture for a period of time in the range of about 30 minutes to about 60 minutes to provide a milled mixture;
   drying the milled mixture at a temperature in the range of about 110° C. to about 140° C. for a period of time in the range of about 8 hours to about 18 hours to provide a dried, milled mixture; and
   calcining the dried, milled mixture at a temperature in the range of about 40° C. to about 700° C. for a period of time in the range of about 30 minutes to about 120 minutes.

13. The process of claim 12, wherein the mixture is milled in a ball mill.

14. The process of claim 12, wherein $H_2O$ is at a temperature in the range of about 10° C. to about 80° C. for preparing the mixture, and $Ba(OH)_2$ is present in an amount in the range of about 25 g/L $H_2O$ to about 1014 g/L $H_2O$ corresponding to the solubility at the temperature of the $H_2O$.

15. The process of claim 12, wherein the dried, milled mixture is calcined in a $CO_2$ gas atmosphere.

16. The process of claim 15, wherein at least a portion of the $CO_2$ gas in the calcining atmosphere is provided by substituting about 3% to about 15% by weight of the $Ba(OH)_2$ with $Ba(OOCH_3)_2$.

17. The process of claim 15, wherein the dried, milled mixture is calcined in a $CO_2$ gas atmosphere at a temperature in the range of about 400° C. to about 700° C.

18. The process of claim 12, wherein the dried, milled mixture is calcined at a temperature of about 650° C.

19. A process for manufacturing a nitrogen oxide storage material, the process comprising:
   mixing $Ba(OH)_2$ with $CeO_2$ and $H_2O$ to provide a mixture, wherein the $Ba(OH)_2$ is present in an amount up to the maximum solubility of $Ba(OH)_2$ in $H_2O$ at the temperature of the $H_2O$, and $CeO_2$ is present in an amount of about 1.75 to about 2.0 times the amount of $Ba(OH)_2$ by weight;
   milling the mixture for a period of time in the range of about 30 minutes to about 60 minutes in a ball mill to provide a milled mixture;
   drying the milled mixture at a temperature in the range of about 110° C. to about 140° C. for a period of time in the range of about 8 hours to about 18 hours to provide a dried, milled mixture; and
   calcining the dried, milled mixture at a temperature in the range of about 200° C. to about 700° C. for a period of time in the range of about 60 minutes to about 120 minutes under a $CO_2$ gas atmosphere.

20. A nitrogen oxide storage material, produced by the process of claim 19.

21. The nitrogen oxide storage material of claim 20, having an average particle size in the range of about 2 microns to about 8 microns and a BET surface area of greater than 40 $m^2/g$.

22. A lean $NO_x$ trap (LNT) catalyst, comprising the nitrogen oxide storage material of claim 20.

23. The LNT catalyst of claim 22, comprising a layer of LNT catalyst material on a honeycomb substrate.

* * * * *